Patented Aug. 31, 1937

2,091,559

UNITED STATES PATENT OFFICE 2,091,559

RUBBER DISPERSIONS AND THEIR PREPARATION

Edward Arthur Murphy and Evelyn William Madge, Wylde Green, Birmingham, England, assignors to Dunlop Rubber Company, Limited, London, England, a British company No Drawing. Application September 5, 1935, Serial No. 39,303. In Great Britain September 14, 1934

3 Claims. (Cl. 134—17)

Our invention relates to artificial aqueous dispersion of rubber and to processes for preparing them.

The preparation of satisfactory artificial dispersions of coagulated rubber according to known commercial processes such as those involving the mastication and stretching of the rubber during the incorporation of the dispersing agents and water, or improved processes wherein part of the dispersing agents are formed in situ, necessitates the use of appreciable quantities of dispersing and protective agents. For example, for the preparation of an artificial dispersion of masticated crepe rubber approximately 6 per cent of soap such as potassium oleate and 4 per cent of a protective agent such as casein or glue are needed to produce a satisfactory dispersion. Reduced quantities not only lead to difficulties in obtaining the inversion, but in such cases the resulting dispersion is granular and not uniform.

However good and necessary these dispersing and protective agents are for the formation of the dispersion, they are very troublesome when it comes to the putting of the dispersion to practical use. For example, due to the presence of the high proportion of stabilizer, the coagula formed are weak and friable and readily absorb water.

Latex on the other hand does not contain such a high proportion of stabilizers or water absorbing material and behaves very differently.

To obtain an artificial dispersion that in this respect resembles or can replace latex the undesirable materials used for its formation or a portion thereof must be eliminated or rendered innocuous.

Our present invention provides an after treatment of artificial aqueous dispersions of rubber, gutta-percha and the like, to lower the protective colloid and stabilizer content of such dispersions so that they resemble ammonia preserved latex in their behavior.

According to our invention, artificial dispersions of rubber, gutta-percha or the like, are treated to remove or render inoperative a proportion of the stabilizing and dispersing agents used in their formation.

The materials used in the formation of the dispersion, a portion of which it is desirable to remove, may comprise soaps such as potassium, sodium, or ammonium oleates; proteins such as glue, casein and albumen; starch, sulphonated products and wetting agents such as sulphonated castor oil, Turkey red oil or proprietary materials such as vulcastab A, Igepon A, sulphonated Lorol and such materials as saponin dextrine, caramel or the gums, in fact the known materials that are used in the formation of artificial dispersions of rubber.

According to one embodiment of the invention a portion of the stabilizing and/or dispersing agents, which are herein designated generically as stabilizers, may be removed by centrifuging. The general method is to dilute the original dispersion to a concentration in the neighborhood of 30 per cent and thereafter reconcentrate by the use of a centrifuge.

It has been found that excessive dilution of artificial dispersion of rubber, gutta-percha or the like has a pronounced destabilizing effect presumably due to the upsetting of the adsorption equilibrium. Such an effect is undesirable in the case of centrifuging, as not only is the concentration of the centrifuged latex affected, but also the running time of the centrifuge is considerably curtailed. This drawback has been overcome by diluting before centrifuging with a soap solution, preferably of the type used in the preparation of the original dispersion. For example, in the case of a dispersion prepared with potassium oleate, a 1 per cent solution of potassium oleate is a satisfactory diluent. By this means the initial equilibrium is substantially maintained and the resulting cream is fluid and of a high concentration.

In the case of the removal of the stabilizer by centrifuging, it is desirable, in order to obtain a good centrifuging efficiency to ensure that the viscosity of the original dispersion and of the final cream is as low as possible. This may be obtained for example by using low jelly strength glues in place of pure gelatin or casein which are solvated or hydrated to a greater degree. Incidentally the use of such materials is cheaper.

The following is an example of a method of preparing a reconstructed latex, i. e., an artificial dispersion having latex-like characteristics wherein a proportion of stabilizers is removed by centrifuging.

An artificial dispersion of composition—

Rubber (masticated crepe) _____ 1000
Oleic acid _____ 60
Caustic potash _____ 20
Glue _____ 40 is diluted to a concentration of 20 per cent with a 1 per cent solution of potassium oleate. After passage through a centrifuge the resulting cream has a concentration of 55 per cent.

According to a second embodiment of the invention a portion of the stabilizers may be removed from the artificial dispersion by creaming. In this case a creaming agent of known type such as sodium alginate, gum tragacanth, Iceland moss etc. is added to the dispersion. It is found in general necessary before creaming to dilute the dispersion to approximately 20 per cent to effect a sufficient separation. The amounts of creaming agent necessary for the creaming of artificial dispersions are also in general greater than those required for the creaming of natural latex.

The following is an example of a method of preparing a reconstructed latex in which a large proportion of the stabilizers is removed by creaming.

An artificial dispersion having a composition given above is diluted to 20 per cent concentration as creaming does not appear to be effective unless the concentration is low.

To this was added 1 per cent of sodium alginate on the wet mix and the mixture allowed to stand. A definite creaming took place, separation taking place in two layers, a heavy creamed layer near the surface, a partially separated layer below this and a clear layer at the bottom. The concentration in the top layer was 50 per cent.

According to a further embodiment of the invention the stabilizing action of a portion of the added ingredients is reduced by the addition of insolubilizing or hardening agents reducing their capacity to swell. Such materials are formaldehyde, trioxymethylene and other tanning materials.

The following is an example of a method of preparing a reconstructed latex by chemical treatment. Again, an artificial dispersion of the above composition is taken and to this a quantity of formaldehyde added in excess of that required to neutralize the ammonia present. The mixture is allowed to stand. Even after standing for 24 hours it is found that the properties of the dispersion have changed considerably in the manner described below.

The difference in behavior between the original dispersion and the treated dispersion particularly those treated by centrifuging or by formaldehyde is very striking.

Before treatment the coagulum formed by, for example, dipping and setting in 5 per cent acetic acid if formed coherently at all is extremely weak and very friable, crumbling to the touch. After treatment the coagulum formed in a similar manner is very strong and elastic.

The difference in behavior between the treated and untreated dispersion as far as gelling is concerned is also very pronounced.

An untreated dispersion sensitized with ammonium sulphate and zinc oxide does not show signs of building up on a hot former until a large proportion of sensitizer is added whereas with the treated dispersions building up on the hot former takes place with small additions of sensitizer in a manner very similar to that exhibited by 60 per cent latex prepared, for example, by centrifuging.

Processes such as the formation of cellular rubber by frothing are difficult to effect with untreated dispersions due to the inability to obtain satisfactory gelling with the large amount of stabilizer present. These on the other hand may be carried out successfully with the treated dispersions.

In all the applications tested, the treated dispersions have behaved in a manner closely resembling latex and by their treatment have a much wider application than possible hitherto.

Having now particularly described our invention, we claim:—

1. A process for forming artificial dispersions of rubber, gutta-percha and the like of predetermined stability, which comprises forming an artificial dispersion of the above materials by mastication and stretching of said materials during the incorporation of dispersing agents and water, and thereafter diluting the dispersion with a solution of stabilizer and centrifuging to separate a portion of the dispersing medium and dispersing agents from the dispersed material.

2. A process for forming artificial dispersions of rubber, gutta-percha and the like of predetermined stability, which comprises forming an artificial dispersion of the above materials by mastication and stretching of said materials during the incorporation of dispersing agents and water, thereafter diluting the dispersion with a solution of stabilizer, and separating the resulting dispersion without coagulation into a less dense portion containing an increased proportion of dispersed particles and a portion of greater density containing a smaller proportion of dispersed particles by the action of forces acting proportionally to the densities of the masses.

3. A process for forming artificial dispersions of rubber, gutta-percha and the like of predetermined stability, which comprises forming an artificial dispersion of the above materials by mastication and stretching of said materials during the incorporation of dispersing agents and water, thereafter diluting the dispersion with a solution of stabilizer, and creaming the resulting diluted dispersion to separate a portion of the dispersing medium and dispersing agents from the dispersed material.

EDWARD ARTHUR MURPHY.
EVELYN WILLIAM MADGE.